US007582277B2

(12) United States Patent
Bauer et al.

(10) Patent No.: US 7,582,277 B2
(45) Date of Patent: *Sep. 1, 2009

(54) SEEDED BOEHMITE PARTICULATE MATERIAL AND METHODS FOR FORMING SAME

(75) Inventors: Ralph Bauer, Niagara Falls (CA); Margaret L. Skowron, Niagara Falls, NY (US); Martin Barnes, Ransomville, NY (US); Doruk O. Yener, Grafton, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/834,527

(22) Filed: Aug. 6, 2007

(65) Prior Publication Data

US 2008/0031808 A1    Feb. 7, 2008

Related U.S. Application Data

(63) Continuation-in-part of application No. 10/845,764, filed on May 14, 2004, now abandoned, which is a continuation-in-part of application No. 10/823,400, filed on Apr. 13, 2004, and a continuation-in-part of application No. 10/414,590, filed on Apr. 16, 2003, now Pat. No. 7,189,775.

(60) Provisional application No. 60/374,014, filed on Apr. 19, 2002.

(51) Int. Cl.
C01F 7/04    (2006.01)
(52) U.S. Cl. .................. 423/625; 423/111; 117/6
(58) Field of Classification Search .......... 117/6, 117/9
See application file for complete search history.

(56) References Cited

U.S. PATENT DOCUMENTS

| | | | |
|---|---|---|---|
| 2,763,620 A | 9/1956 | Bugosh | |
| 2,915,475 A | 12/1959 | Bugosh | |
| 3,108,888 A | 10/1963 | Bugosh | |
| 3,321,272 A | 5/1967 | Kerr | |
| 3,357,791 A | 12/1967 | Napier | |
| 3,385,663 A | 5/1968 | Hughes | |
| 3,387,447 A | 6/1968 | Trammell et al. | |
| 3,814,782 A | 6/1974 | Hayes et al. | |
| 3,842,111 A | 10/1974 | Meyer-Simon et al. | |
| 3,853,688 A | 12/1974 | D'Ambrosio | |
| 3,865,917 A | 2/1975 | Galasso et al. | |
| 3,873,489 A | 3/1975 | Thurn et al. | |
| 3,950,180 A | 4/1976 | Kato | |
| 3,978,103 A | 8/1976 | Meyer-Simon et al. | |
| 3,997,581 A | 12/1976 | Pletka et al. | |
| 4,002,594 A | 1/1977 | Fetterman | |
| 4,105,465 A | 8/1978 | Berger | |
| 4,117,105 A | 9/1978 | Hertzenberg et al. | |
| 4,120,943 A | 10/1978 | Iwaisako et al. | |
| 4,344,928 A | 8/1982 | Dupin et al. | |
| 4,377,418 A | 3/1983 | Birchall et al. | |
| 4,386,185 A | 5/1983 | Macdonell et al. | |
| 4,492,682 A | 1/1985 | Trebillion | |
| 4,525,494 A | 6/1985 | Andy | |
| 4,539,365 A | 9/1985 | Rhee | |
| 4,558,102 A | 12/1985 | Miyata | |
| 4,623,738 A | 11/1986 | Sugerman et al. | |
| 4,632,364 A | 12/1986 | Smith | |
| 4,716,029 A | 12/1987 | Oguri et al. | |
| 4,769,179 A | 9/1988 | Kato et al. | |
| 4,797,139 A | 1/1989 | Bauer | |
| 4,891,127 A | 1/1990 | Murrel et al. | |
| 4,946,666 A | 8/1990 | Brown | |
| 4,992,199 A | 2/1991 | Meyer et al. | |
| 5,155,085 A | 10/1992 | Hamano et al. | |
| 5,194,243 A | 3/1993 | Pearson et al. | |
| 5,286,290 A | 2/1994 | Risley | |
| 5,302,368 A | 4/1994 | Harato et al. | |
| 5,306,680 A | 4/1994 | Fukuda | |
| 5,318,628 A | 6/1994 | Matijevic et al. | |
| 5,321,055 A | 6/1994 | Slocum | |
| 5,332,777 A | 7/1994 | Goetz et al. | |
| 5,344,489 A | 9/1994 | Matijevic et al. | |

(Continued)

FOREIGN PATENT DOCUMENTS

| | | |
|---|---|---|
| CN | 1237146 A | 12/1999 |
| CN | 1266020 A | 9/2000 |
| CS | 195426 | 5/1982 |
| DE | 956535 | 1/1957 |

(Continued)

OTHER PUBLICATIONS

Zhang, L. et al., "Preparation and Characterization of Nano-fibrous g-Al2O3," Shiyou Huagong, vol. 33, No. 3, pp. 240-243, 2004. Abstract Only.

Zhu, H. et al., "Novel Synthesis of Alumina Oxide Nanofibers," Materials Research Society Symposium Proceedings, vol. 703, pp. 25-30, 2002. Abstract Only.

Zhu, H., et al., "g-Alumina Nanofibers Prepared From Aluminum Hydrate with Poly(ethylene oxide) Surfactant," Chemistry of Materials, vol. 14, No. 5, pp. 2086-2093, 2002. Abstract Only.

Wakayama, H., et al., "Nanoporous Metal Oxides Xynthesized by the Nanoscale Casting Process Using Supercritical Fluids," Chemistry of Materials, vol. 13, No. 7, pp. 2392-2396, 2001. Abstract Only.

(Continued)

Primary Examiner—Tae H Yoon
(74) Attorney, Agent, or Firm—Larson Newman Abel & Polansky, LLP; Joseph P. Sullivan

(57) ABSTRACT

A boehmite particulate material is disclosed. The material is formed by a process that includes providing a boehmite precursor and boehmite seeds in a suspension, and heat treating the suspension to convert the boehmite precursor into boehmite particulate material. The boehmite particulate material has an aspect ratio of not less than 3:1.

14 Claims, 3 Drawing Sheets

U.S. PATENT DOCUMENTS

| | | | |
|---|---|---|---|
| 5,401,703 A | 3/1995 | Fukuda | |
| 5,413,985 A | 5/1995 | Thome et al. | |
| 5,445,807 A | 8/1995 | Pearson | |
| 5,508,016 A | 4/1996 | Yamanishi et al. | |
| 5,527,851 A | 6/1996 | Barron et al. | |
| 5,550,180 A | 8/1996 | Elsik et al. | |
| 5,580,914 A | 12/1996 | Falla et al. | |
| 5,580,919 A | 12/1996 | Agostini et al. | |
| 5,583,245 A | 12/1996 | Parker et al. | |
| 5,663,396 A | 9/1997 | Musleve et al. | |
| 5,684,171 A | 11/1997 | Wideman et al. | |
| 5,684,172 A | 11/1997 | Wideman et al. | |
| 5,696,197 A | 12/1997 | Smith et al. | |
| 5,707,716 A | 1/1998 | Yoshino et al. | |
| 5,723,529 A | 3/1998 | Bernard et al. | |
| 5,849,827 A | 12/1998 | Boediger et al. | |
| 5,900,449 A | 5/1999 | Custodero et al. | |
| 5,955,142 A | 9/1999 | Yoshino et al. | |
| 5,962,124 A | 10/1999 | Yoshino et al. | |
| 5,989,515 A | 11/1999 | Watanabe et al. | |
| 6,017,632 A | 1/2000 | Pinnavaia et al. | |
| 6,143,816 A | 11/2000 | Prescher et al. | |
| 6,156,835 A | 12/2000 | Anderson et al. | |
| 6,203,695 B1 | 3/2001 | Harle et al. | |
| 6,403,007 B1 | 6/2002 | Kido et al. | |
| 6,413,308 B1 | 7/2002 | Xu et al. | |
| 6,417,286 B1 | 7/2002 | Agostini et al. | |
| 6,440,187 B1 | 8/2002 | Kasai et al. | |
| 6,440,552 B1 | 8/2002 | Kajihara et al. | |
| 6,485,656 B1 | 11/2002 | Meyer et al. | |
| 6,486,254 B1 | 11/2002 | Barbee et al. | |
| 6,534,584 B2 | 3/2003 | Wideman et al. | |
| 6,576,324 B2 | 6/2003 | Yoshino et al. | |
| 6,610,261 B1 | 8/2003 | Custodero et al. | |
| 6,635,700 B2 | 10/2003 | Cruse et al. | |
| 6,646,026 B2 | 11/2003 | Fan et al. | |
| 6,648,959 B1 | 11/2003 | Fischer et al. | |
| 6,653,387 B2 | 11/2003 | Causa et al. | |
| 6,689,432 B2 | 2/2004 | Kitamura et al. | |
| 6,706,660 B2 | 3/2004 | Park | |
| 6,747,087 B2 | 6/2004 | Custodero et al. | |
| 6,841,207 B2 | 1/2005 | Burch et al. | |
| 6,858,665 B2 | 2/2005 | Larson | |
| 6,872,444 B2 | 3/2005 | McDonald et al. | |
| 6,924,011 B2 | 8/2005 | Van Aert et al. | |
| 7,056,585 B2 | 6/2006 | Mishima et al. | |
| 7,189,775 B2 | 3/2007 | Tang et al. | |
| 7,211,612 B2 | 5/2007 | Kikuchi | |
| 7,226,647 B2 | 6/2007 | Kasperchik et al. | |
| 7,531,161 B2 | 5/2009 | Tang et al. | |
| 2002/0004549 A1 | 1/2002 | Custodero et al. | |
| 2002/0169243 A1 | 11/2002 | Nippa | |
| 2003/0197300 A1 | 10/2003 | Tang et al. | |
| 2003/0202923 A1 | 10/2003 | Custodero et al. | |
| 2004/0030017 A1 | 2/2004 | Simonot et al. | |
| 2004/0120904 A1 | 6/2004 | Lye et al. | |
| 2004/0265219 A1 | 12/2004 | Bauer et al. | |
| 2005/0124745 A1 | 6/2005 | Bauer et al. | |
| 2005/0227000 A1 | 10/2005 | Bauer et al. | |
| 2005/0267238 A1 | 12/2005 | Mutin | |
| 2006/0104895 A1 | 5/2006 | Bauer et al. | |
| 2006/0106129 A1 | 5/2006 | Gernon et al. | |
| 2006/0148955 A1 | 7/2006 | Guiselin et al. | |
| 2007/0104952 A1 | 5/2007 | Bianchi et al. | |
| 2008/0031808 A1 | 2/2008 | Bauer et al. | |

FOREIGN PATENT DOCUMENTS

| | | |
|---|---|---|
| DE | 2163678 | 7/1973 |
| DE | 2408122 | 8/1974 |
| DE | 2952666 | 7/1980 |
| EP | 0 038 620 A2 | 10/1981 |
| EP | 0 108 968 A1 | 5/1984 |
| EP | 0 304 721 A1 | 3/1989 |
| EP | 0 563 653 A1 | 10/1993 |
| EP | 0 667 405 A1 | 8/1995 |
| EP | 0 501 227 B1 | 12/1995 |
| EP | 0 735 001 A2 | 10/1996 |
| EP | 0 885 844 A1 | 12/1998 |
| EP | 0 896 021 A1 | 2/1999 |
| EP | 1 225 200 A2 | 7/2002 |
| EP | 1 256 599 A1 | 11/2002 |
| EP | 1 323 775 A1 | 7/2003 |
| EP | 0 697 432 B1 | 10/2003 |
| EP | 1 000 965 B1 | 10/2003 |
| EP | 0 807 603 B1 | 12/2003 |
| EP | 1 112 961 B1 | 9/2004 |
| EP | 0736392 A1 | 10/2006 |
| GB | 1189304 | 4/1970 |
| GB | 2248841 | 4/1992 |
| HU | 26758 T | 9/1983 |
| JP | 45-032530 | 10/1970 |
| JP | 55-116622 A | 9/1980 |
| JP | 56-009427 A | 1/1981 |
| JP | 0 015 196 | 4/1982 |
| JP | 58-026029 A2 | 2/1983 |
| JP | 58-1865434 A | 10/1983 |
| JP | 59-193949 | 11/1984 |
| JP | 61-179264 A | 8/1986 |
| JP | 62-030133 A | 2/1987 |
| JP | 63-147820 A2 | 6/1988 |
| JP | 63-147821 A2 | 6/1988 |
| JP | 05-279019 | 10/1993 |
| JP | 63-22243 | 11/1994 |
| JP | 7-18174 | 1/1995 |
| JP | 09-208809 | 8/1997 |
| JP | 9-511258 | 11/1997 |
| JP | 200-239014 | 9/2000 |
| JP | 2001-058818 A | 3/2001 |
| JP | 2001-180930 | 7/2001 |
| JP | 2001/207077 | 7/2001 |
| JP | 2001-261976 | 9/2001 |
| JP | 2003-002642 | 1/2003 |
| JP | 2003-054941 | 2/2003 |
| JP | 2003-107206 | 4/2003 |
| JP | 2003-238150 | 8/2003 |
| JP | 2004-051390 A2 | 2/2004 |
| JP | 2004-59643 A | 2/2004 |
| SU | 264064 A | 7/1970 |
| WO | WO 95/11270 | 4/1995 |
| WO | WO 97/23566 | 7/1997 |
| WO | WO 98/14426 | 4/1998 |
| WO | 99/35089 A1 | 7/1999 |
| WO | WO 01088265 A2 | 11/2001 |
| WO | WO 03/089508 A1 | 10/2003 |
| WO | WO 2004/016630 A1 | 2/2004 |
| WO | WO 2004/056915 A1 | 7/2004 |
| WO | WO 2004/090023 A1 | 10/2004 |
| WO | WO 2005/100244 A2 | 10/2005 |
| WO | WO 2005/100491 A2 | 10/2005 |
| WO | WO 2006/002993 A1 | 1/2006 |
| WO | WO 2006/049863 A1 | 5/2006 |
| WO | WO 2006/060206 A1 | 6/2006 |
| WO | WO 2006/060468 A3 | 6/2006 |
| WO | WO 2007/056404 A1 | 5/2007 |

OTHER PUBLICATIONS

Yu, Z. et al., "Preparation of Nanometer-sized Alumina Whiskers," Journal of Materails Research, vol. 13, No. 11, pp. 3017-3018, 1998. Abstract Only.

Kimura, Y., et al., "Synthesis of poly[(acyloxy)aloxane] with carboxyl ligand and its utilization for hte processing of alumina fiber," vol. 20, No. 10, pp. 2329-2334, 1987. Abstract Only.

Podergin, V., et al., "Electron-microscopic study of whiskers formed during pentoxide reduction by alunium," Metalloterm, Protsessy Khim. Met., pp. 44-50, 1972. Abstract Only.

Park, B., et al., "Preparation of High-Capacity Ceramic Catalytic Support from Gibbsite," Han'Guk Seramik Hakhoechi, vol. 39, No. 3, pp. 245-251, 2002. Abstract Only.

Brusasco R., et al., "Preparation and Characterization of Fibrillar Boehmite and g-Aluminum Oxide," Materials Research Bulletin, vol. 19, No. 11, pp. 1489-1496, 1984. Abstract Only.

Kuang, X., et al., "Preparation of Special-shaped g-AlOOH g-Al2O3 Ultrafine Powders by Hydrothermal Reaction Method," Materials and Components for Engines, pp. 594-597, 1994, Abstract Only.

Liu, S., et al., "Synthesis of Novel Nanostructured g-Al2O3 by Pyrolysis of Aluminumoxyhydride-HAlO," Journal of Materials Chemistry, vol. 13, No. 12, pp. 3107-3111, 2003. Abstract Only.

Hicks, R., et al., "Nanoparticle Assembly of Mesoporous AlOOH (Boehmite)," Chemistry of Materials, vol. 15, No. 1, pp. 78-82, 2003. Abstract Only.

Ozuna, O., et al., "Pressure Influenced Combustion Synthesis of Gamma- and Alpha-Al2O3 Nanocrystalline," Journal of Physics-Condensed Matter, vol. 16, No. 15, pp. 2585-2591, 2004. Abstract Only.

McHale, J. et al., "Effects of Increased Surface Area and Chemisorbed H2O on hte Relative Stability of Nanocrystalline Gamma-Al2O3 and Al2O3," Journal of Physical Chemistry, vol. 101, No. 4, pp. 603-613, 1997. Abstract Only.

Kuang, D., et al., "Fabrication of Boehmite AlOOH and Gamma-Al2O3 Nanotubes via a Soft Solution Route," Journal of Materials Chemistry, vol. 13, No. 4, pp. 660-662, 2003. Abstract Only.

Tijburg, I., et al., "Sintering of Pseudo-Boehmite And Gamma Al2O3," Journal of Materials Science, vol. 26, No. 21, pp. 5945-5949, 1991. Abstract Only.

Wei, Z. et al., "Research for Separation of Precursor in the Preparation Process of Gamma-Al2O3 Ultrafine Powder via Precipitation," Journal of Basic Science and Engineering, vol. 12, pp. 19-23, 2004. Abstract Only.

Singhal, A., "Aluminum Speciation in Aqueous Solutions and Its Effect on Properties of Chemically Synthesized Alumina Powders (Ceramics)," Dissertation Abstracts International, vol. 55, No. 04-B, 1994. Abstract Only.

Kim, S., et al., "Preparation of High-Temperature Catalytic Support from Gabbsite II. Properties of Amorphous Alumina as Precursor of Catalyst," Journal of the Korean Ceramic Society, vol. 33, No. 1, pp. 92-100, 1996. Abstract Only.

Zhang, Z., et al., "Mesostructured Forms of Gamma-A(sub2)O(sub 3)," J. Am. Chemc. Soc., Vo. 124, No. 8, p. 15, ISSN/ISBN: 00027863. Abstract Only.

Llusar, M. et al., "Templated growth of Alumina-based Fibers Through the Use of Anthracenic Organogelators," Chemistry of Materials, vol. 14, No. 12, pp. 5124-5133, 2002. Abstract Only.

Strek, W., et al., "Preparation and Emission Spectra of Eu(III) in Nanostrcutred Gamma-Alumina," Spectrochimica Acta, Part A, vol. 54A, No. 13, pp. 2121-2124, 1997. Abstract Only.

Yogo, T., et al., "Synthesis of Polycrystalline Alumina Fibre with Aluminium Chelate Precursor," Journal of Materials Science, vol. 26, No. 19, pp. 5292-5296, 1999. Abstract Only.

Saraswati, V., et al., "X-ray Diffraction in Gamma-alumina Whiskers," Journal of Crystal Growth, vol. 83, No. 4, pp. 606-609, 1987. Abstract Only.

Zhu, H., et al., "Growth of Boehmite Nanoribers by Assembling Nanoparticles with Surfactant Micelles," Journal of Physical Chemistry, vol. 108, No. 14, pp. 4245-4247, 2006. Abstract Only.

Kamiya, K., et al., "Crystallization Behavior of Sol-Gel-Derived Alumina Fibers. Formation of .Alpha.-alumina Around 500.DEG.C.," Jinko Kessho Toronkai Koen Yoshishu, vol. 41, pp. 9-10, 1996. Abstract Only.

Lucuta, P., et al., "Phase Evolution in Al3O3 Fibre Prepared From an Oxychloride Precursor," Journal of Materials Science, vol. 27, No. 22, pp. 6053-6061, 1992. Abstract Only.

Thomas J. Martin, Sasol Presentation given on—Functionalized Aluminas, NABALTECH, web page: http://www.nabaltec.de/seiten_d/boehmit_d/anwendungen/news_05_08_98.htm.

Zhu, H. Y., et al., "Growth of Boehmite Nanofibers by Assembling Nanoparticles with Surfactant Micelles", J. Phys. Chem. B., vol. 108, pp. 4245-4247, 2004.

Fisch, H., et al., "Hybrid Materials Based On Polymer Matrices & Organic Components", NTIS, Germany 1994.

Buining et al., J. Am. Ceram. Soc. vol. 74 [6], pp. 1303-1307, 1991.

Anonymous: "High Purity Dispersible Aluminas"; URL:http://www.sasol.com/sasol_internet/downloads/DISPERAL-DISPAL_1055338543391.pdf>abstract; tables 1,2, 2003.

Boccaccini A. R. et al; "Alumina Ceramics Based on Seeded Boehmite and Electrophoretic Deposition"; Ceramics International; Elsevier; Amsterdam, NL; vol. 28, No. 8, 2002; pp. 893-897.

Grant et al., "Grant and Hackh's Chemical Dictionary", 5th Ed., (1987), McGraw-Hill Book. Co. USA, ISBN 0-07-024067-1, p. 160.

SEEDED BOEHMITE PARTICULATE MATERIAL AND METHODS FOR FORMING SAME

CROSS-REFERENCE TO RELATED APPLICATION(S)

This application is a continuation-in-part application of U.S. patent application Ser. No. 10/845,764, filed May 14, 2004, now abandoned which is (i) a continuation-in-part application of U.S. patent application Ser. No. 10/414,590, filed Apr. 16, 2003, now U.S. Pat. No. 7,189,775, which in turn is a non-provisional application of U.S. Provisional Application 60/374,014 filed Apr. 19, 2002, and (ii) a continuation-in-part application of U.S. patent application Ser. No. 10/823,400, filed Apr. 13, 2004. Priority to the foregoing applications is hereby claimed, and the subject matter thereof hereby incorporated by reference.

BACKGROUND

1. Field of the Invention

The present invention generally relates to boehmite particulate material and processes for forming same. More specifically, the present invention relates to seeded boehmite particulate material having morphological features.

2. Description of the Related Art

Boehmite particulate material finds particular application as a desirable raw material for forming aluminous products, for example, alumina abrasive grains having high performance characteristics. In this context, the U.S. Pat. No. 4,797,139, commonly owned by the present Assignee, discloses a particular process for forming boehmite particulate material, which is then used as a feedstock material for later stage processing to form alumina abrasive grains. As described, the boehmite material is formed by a seeded process, and is limited in scope to boehmite particulate material that is adapted to form alumina abrasive grains. As such, the disclosed particulate material has particularly desired spherical morphology, which makes it suitable for abrasive applications.

Beyond abrasive applications, there is a particular desirability for creating boehmite particulate material having varying morphology. Since particulate morphology can have a profound impact upon the applications of the material, a need has arisen in the art for creation of new materials for applications beyond abrasives, including fillers utilized in specialty coating products and various polymer products. Other applications include those in which the boehmite material is utilized in its as-formed state, rather than as a feedstock material. In addition to the interest in creating new materials, processing technology enabling the formation of such materials needs to be developed as well. In this regard, such processing technology is desirably cost effective, is relatively straightforward to control, and provides high yields.

SUMMARY

According to one aspect, boehmite particulate material formed by seeded processing has an aspect ratio of not less than 3:1.

According to another aspect of the present invention, a boehmite particulate material is formed by a process that includes providing a boehmite precursor and boehmite seeds in a suspension, and heat treating the suspension to convert the boehmite precursor into boehmite particulate material. The particulate material may have a certain morphology, such as a relatively high aspect ratio, such as not less than about 2:1, such as not less than about 3:1.

Still further, according to another aspect of the present invention, boehmite particulate material is formed by a process including providing a boehmite precursor and boehmite seeds in a suspension, and heat-treating the suspension to convert the boehmite precursor into boehmite particulate material. Here, the boehmite particulate material is comprised of platelets, and has an aspect of not less than about 2:1.

DESCRIPTION OF THE PREFERRED EMBODIMENT(S)

Figure 1:
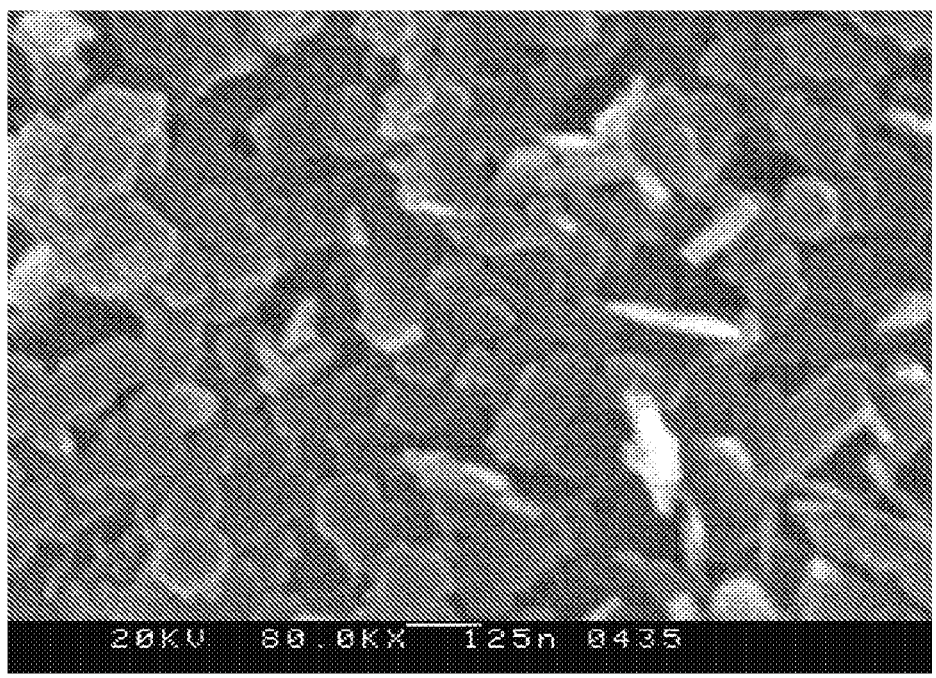
FIG. 1 is an SEM micrograph illustrating platelet-shaped boehmite particulate material.

According to an embodiment of the present invention, a boehmite particulate material is formed by a process that includes providing a boehmite precursor and boehmite seeds in a suspension, and heat treating (such as by hydrothermal treatment) the suspension (alternatively sol or slurry) to convert the boehmite precursor into boehmite particulate material formed of particles or crystallites. According to a particular aspect, the boehmite particulate material has a relatively elongated morphology, described generally herein in terms of aspect ratio, described below.

The term "boehmite" is generally used herein to denote alumina hydrates including mineral boehmite, typically being $Al_2O_3 \cdot H_2O$ and having a water content on the order of 15%, as well as psuedoboehmite, having a water content higher than 15%, such as 20-38% by weight. It is noted that boehmite (including psuedoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

The aspect ratio, defined as the ratio of the longest dimension to the next longest dimension perpendicular to the longest dimension, is generally not less than 2:1, and preferably not less than 3:1, 4:1, or 6:1. Indeed, certain embodiments have relatively elongated particles, such as not less than 9:1, 10:1, and in some cases, not less than 14:1. With particular reference to needle-shaped particles, the particles may be further characterized with reference to a secondary aspect ratio defined as the ratio of the second longest dimension to the third longest dimension. The secondary aspect ratio is generally not greater than 3:1, typically not greater than 2:1, or even 1.5:1, and oftentimes about 1:1. The secondary aspect ratio generally describes the cross-sectional geometry of the particles in a plane perpendicular to the longest dimension.

Platey or platelet-shaped particles generally have an elongated structure having the aspect ratios described above in connection with the needle-shaped particles. However, platelet-shaped particles generally have opposite major surfaces, the opposite major surfaces being generally planar and generally parallel to each other. In addition, the platelet-shaped particles may be characterized as having a secondary aspect ratio greater than that of needle-shaped particles, generally not less than about 3:1, such as not less than about 6:1, or even not less than 10:1. Typically, the shortest dimension or edge dimension, perpendicular to the opposite major surfaces or faces, is generally less than 50 nanometers.

Morphology of the boehmite particulate material may be further defined in terms of particle size, more particularly, average particle size. Here, the seeded boehmite particulate material, that is, boehmite formed through a seeding process (described in more detail below) has a relatively fine particle or crystallite size. Generally, the average particle size is not greater than about 1000 nanometers, and fall within a range of about 100 to 1000 nanometers. Other embodiments have even finer average particle sizes, such as not greater than about 800 nanometers, 600 nanometers, 500 nanometers, 400 nanometers, and even particles having an average particle size smaller than 300 nanometers, representing a fine particulate material.

As used herein, the "average particle size" is used to denote the average longest or length dimension of the particles. Due to the elongated morphology of the particles, conventional characterization technology is generally inadequate to measure average particle size, since characterization technology is generally based upon an assumption that the particles are spherical or near-spherical. Accordingly, average particle size was determined by taking multiple representative samples and physically measuring the particle sizes found in representative samples. Such samples may be taken by various characterization techniques, such as by scanning electron microscopy (SEM).

The present seeded boehmite particulate material has been found to have a fine average particle size, while oftentimes competing non-seeded based technologies are generally incapable of providing such fine average particle sizes. In this regard, it is noted that oftentimes in the literature, reported particle sizes are not set forth in the context of averages as in the present specification, but rather, in the context of nominal range of particle sizes derived from physical inspection of samples of the particulate material. Accordingly, the average particle size will lie within the reported range in the prior art, generally at about the arithmetic midpoint of the reported range, for the expected Gaussian particle size distribution. Stated alternatively, while non-seeded based technologies may report fine particle size, such fine sizing generally denotes the lower limit of an observed particle size distribution and not average particle size.

Likewise, in a similar manner, the above-reported aspect ratios generally correspond to the average aspect ratio taken from representative sampling, rather than upper or lower limits associated with the aspect ratios of the particulate material. Oftentimes in the literature, reported particle aspect ratios are not set forth in the context of averages as in the present specification, but rather, in the context of nominal range of aspect ratios derived from physical inspection of samples of the particulate material. Accordingly, the average aspect ratio will lie within the reported range in the prior art, generally at about the arithmetic midpoint of the reported range, for the expected Gaussian particle morphology distribution. Stated alternatively, while non-seeded based technologies may report aspect ratio, such data generally denotes the lower limit of an observed aspect ratio distribution and not average aspect ratio.

In addition to aspect ratio and average particle size of the particulate material, morphology of the particulate material may be further characterized in terms of specific surface area.

Here, the commonly available BET technique was utilized to measure specific surface area of the particulate material. According to embodiments herein, the boehmite particulate material has a relatively high specific surface area, generally not less than about 10 $m^2/g$, such as not less than about 50 $m^2/g$, 70 $m^2/g$, or not less than about 90 $m^2/g$. Since specific surface area is a function of particle morphology as well as particle size, generally the specific surface area of embodiments was less than about 400 $m^2/g$, such as less than about 350 or 300 $m^2/g$.

Turning to the details of the processes by which the boehmite particulate material may be manufactured, generally ellipsoid, needle, or platelet-shaped boehmite particles are formed from a boehmite precursor, typically an aluminous material including bauxitic minerals, by hydrothermal treatment as generally described in the commonly owned patent described above, U.S. Pat. No. 4,797,139. More specifically, the boehmite particulate material may be formed by combining the boehmite precursor and boehmite seeds in suspension, exposing the suspension (alternatively sol or slurry) to heat treatment to cause conversion of the raw material into boehmite particulate material, further influenced by the boehmite seeds provided in suspension. Heating is generally carried out in an autogenous environment, that is, in an autoclave, such that an elevated pressure is generated during processing. The pH of the suspension is generally selected from a value of less than 7 or greater than 8, and the boehmite seed material has a particle size finer than about 0.5 microns. Generally, the seed particles are present in an amount greater than about 1% by weight of the boehmite precursor (calculated as $Al_2O_3$), and heating is carried out at a temperature greater than about 120° C., such as greater than about 125° C., or even greater than about 130° C., and at a pressure greater than about 85 psi, such as greater than about 90 psi, 100 psi, or even greater than about 110 psi.

The particulate material may be fabricated with extended hydrothermal conditions combined with relatively low seeding levels and acidic pH, resulting in preferential growth of boehmite along one axis or two axes. Longer hydrothermal treatment may be used to produce even longer and higher aspect ratio of the boehmite particles and/or larger particles in general.

Following heat treatment, such as by hydrothermal treatment, and boehmite conversion, the liquid content is generally removed, such as through an ultrafiltration process or by heat treatment to evaporate the remaining liquid. Thereafter, the resulting mass is generally crushed, such to 100 mesh. It is noted that the particulate size described herein generally describes the single crystallites formed through processing, rather than the aggregates which may remain in certain embodiments (e.g., for those products that call for and aggregated material).

According to data gathered by the present inventors, several variables may be modified during the processing of the boehmite raw material, to effect the desired morphology. These variables notably include the weight ratio, that is, the ratio of boehmite precursor to boehmite seed, the particular type or species of acid or base used during processing (as well as the relative pH level), and the temperature (which is directly proportional to pressure in an autogenous hydrothermal environment) of the system.

In particular, when the weight ratio is modified while holding the other variables constant, the shape and size of the particles forming the boehmite particulate material are modified. For example, when processing is carried at 180° C. for two hours in a 2 weight % nitric acid solution, a 90:10 ATH: boehmite seed ratio forms needle-shaped particles (ATH being a species of boehmite precursor). In contrast, when the ATH:boehmite seed ratio is reduced to a value of 80:20, the particles become more elliptically shaped. Still further, when the ratio is further reduced to 60:40, the particles become near-spherical. Accordingly, most typically the ratio of boehmite precursor to boehmite seeds is not less than about 60:40, such as not less than about 70:30 or 80:20. However, to ensure adequate seeding levels to promote the fine particulate morphology that is desired, the weight ratio of boehmite precursor to boehmite seeds is generally not greater than about 98:2. Based on the foregoing, an increase in weight ratio generally increases aspect ratio, while a decrease in weight ratio generally decreased aspect ratio.

Further, when the type of acid or base is modified, holding the other variables constant, the shape (e.g., aspect ratio) and size of the particles are affected. For example, when processing is carried out at 100° C. for two hours with an ATH:boehmite seed ratio of 90:10 in a 2 weight % nitric acid solution, the synthesized particles are generally needle-shaped, in contrast, when the acid is substituted with HCl at a content of 1 weight % or less, the synthesized particles are generally near spherical. When 2 weight % or higher of HCl is utilized, the synthesized particles become generally needle-shaped. At 1 weight % formic acid, the synthesized particles are platelet-shaped. Further, with use of a basic solution, such as 1 weight % KOH, the synthesized particles are platelet-shaped. If a mixture of acids and bases is utilized, such as 1 weight % KOH and 0.7 weight % nitric acid, the morphology of the synthesized particles is platelet-shaped.

Suitable acids and bases include mineral acids such as nitric acid, organic acids such as formic acid, halogen acids such as hydrochloric acid, and acidic salts such as aluminum nitrate and magnesium sulfate. Effective bases include, for example, amines including ammonia, alkali hydroxides such as potassium hydroxide, alkaline hydroxides such as calcium hydroxide, and basic salts.

Still further, when temperature is modified while holding other variables constant, typically changes are manifested in particle size. For example, when processing is carried out at an ATH:boehmite seed ratio of 90:10 in a 2 weight % nitric acid solution at 150° C. for two hours, the crystalline size from XRD (x-ray diffraction characterization) was found to be 115 Angstroms. However, at 160° C. the average particle size was found to be 143 Angstroms. Accordingly, as temperature is increased, particle size is also increased, representing a directly proportional relationship between particle size and temperature.

Example 1

Plate-Shaped Particle Synthesis

An autoclave was charged with 7.42 lb. of Hydral 710 aluminum trihydroxide purchased from Alcoa; 0.82 lb of boehmite obtained from SASOL under the name—Catapal B pseudoboehmite; 66.5 lb of deionized water; 0.037 lb potassium hydroxide; and 0.18 lb of 22 wt % nitric acid. The boehmite was pre-dispersed in 5 lb of the water and 0.18 lb of the acid before adding to the aluminum trihydroxide and the remaining water and potassium hydroxide.

The autoclave was heated to 185° C. over a 45 minute period and maintained at that temperature for 2 hours with stirring at 530 rpm. An autogenously generated pressure of about 163 psi was reached and maintained. Thereafter the boehmite dispersion was removed from the autoclave. After autoclave the pH of the sol was about 10. The liquid content was removed at a temperature of 65° C. The resultant mass was crushed to less than 100 mesh. The SSA of the resultant powder was about 62 $m^2/g$.

Example 2

Needle-Shaped Particle Synthesis

An autoclave was charged with 250 g of Hydral 710 aluminum trihydroxide purchased from Alcoa; 25 g of boehmite obtained from SASOL under the name—Catapal B pseudoboehmite; 1000 g of deionized water; and 34.7 g of 18% nitric acid. The boehmite was pre-dispersed in 100 g of the water and 6.9 g of the acid before adding to the aluminum trihydroxide and the remaining water and acid.

The autoclave was heated to 180° C. over a 45 minute period and maintained at that temperature for 2 hours with stirring at 530 rpm. An autogenously generated pressure of about 150 psi was reached and maintained. Thereafter the boehmite dispersion was removed from the autoclave. After autoclave the pH of the sol was about 3. The liquid content was removed at a temperature of 95° C. The resultant mass was crushed to less than 100 mesh. The SSA of the resultant powder was about 120 $m^2/g$.

Example 3

Ellipsoid Shaped Particle Synthesis

An autoclave was charged with 220 g of Hydral 710 aluminum trihydroxide purchased from Alcoa; 55 g of boehmite obtained from SASOL under the name—Catapal B pseudoboehmite; 1000 g of deionized water; and 21.4 g of 18% nitric acid. The boehmite was pre-dispersed in 100 g of the water and 15.3 g of the acid before adding to the aluminum trihydroxide and the remaining water and acid.

The autoclave was heated to 172° C. over a 45 minute period and maintained at that temperature for 3 hours with stirring at 530 rpm. An autogenously generated pressure of about 120 psi was reached and maintained. Thereafter the boehmite dispersion was removed from the autoclave. After autoclave the pH of the sol was about 4. The liquid content was removed at a temperature of 95° C. The resultant mass was crushed to less than 100 mesh. The SSA of the resultant powder was about 135 $m^2/g$.

Example 4

Near Spherical Particle Synthesis

An autoclave was charged with 165 g of Hydral 710 aluminum trihydroxide purchased from Alcoa; 110 g of boehmite obtained from SASOL under the name—Catapal B pseudoboehmite; 1000 g of deionized water; and 35.2 g of 18% nitric acid. The boehmite was pre-dispersed in 100 g of the water and 30.6 g of the acid before adding to the aluminum trihydroxide and the remaining water and acid.

The autoclave was heated to 160° C. over a 45 minute period and maintained at that temperature for 2.5 hours with stirring at 530 rpm. An autogenously generated pressure of about 100 psi was reached and maintained. Thereafter the boehmite dispersion was removed from the autoclave. After autoclave the pH of the sol was about 3.5. The liquid content was removed at a temperature of 95° C. The resultant mass was crushed to less than 100 mesh. The SSA of the resultant powder was about 196 $m^2/g$.

According to embodiments described herein, a relatively powerful and flexible process methodology may be employed to engineer desired morphologies into the final boehmite product. Of particular significance, embodiments utilize seeded processing resulting in a cost-effective processing route with a high degree of process control which may result in desired fine average particle sizes as well as controlled particle size distributions. The combination of (i) identifying and controlling key variables in the process methodology, such as weight ratio, acid and base species and temperature, and (ii) seeding-based technology is of particular significance, providing repeatable and controllable processing of desired boehmite particulate material morphologies.

Figure 2:
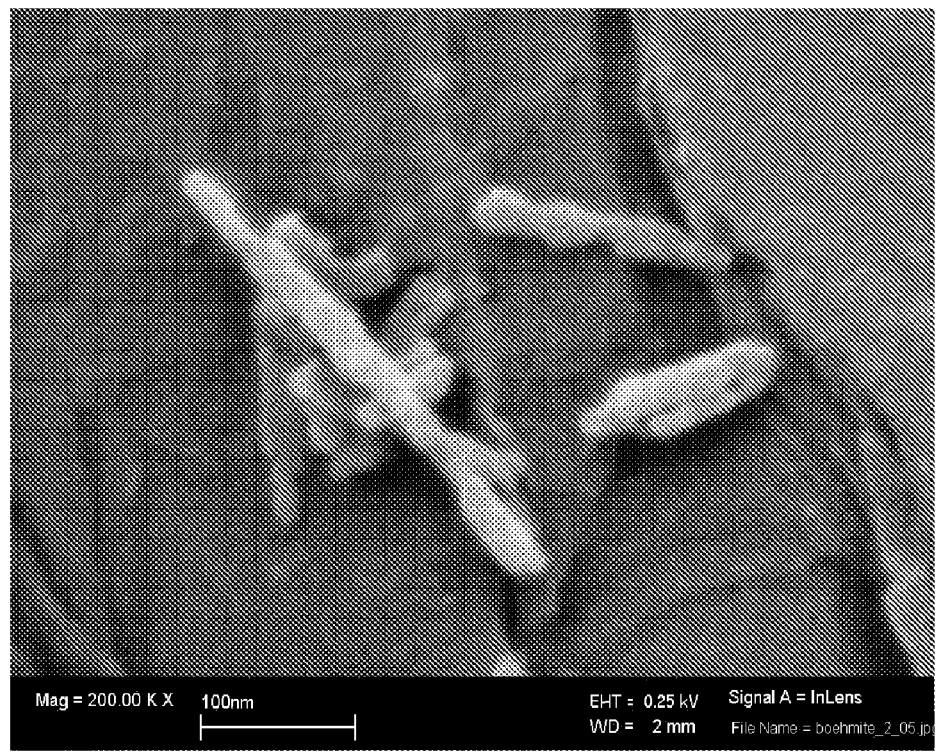
FIG. 2 is an SEM micrograph illustrating needle-shaped boehmite particulate material.
Figure 3:
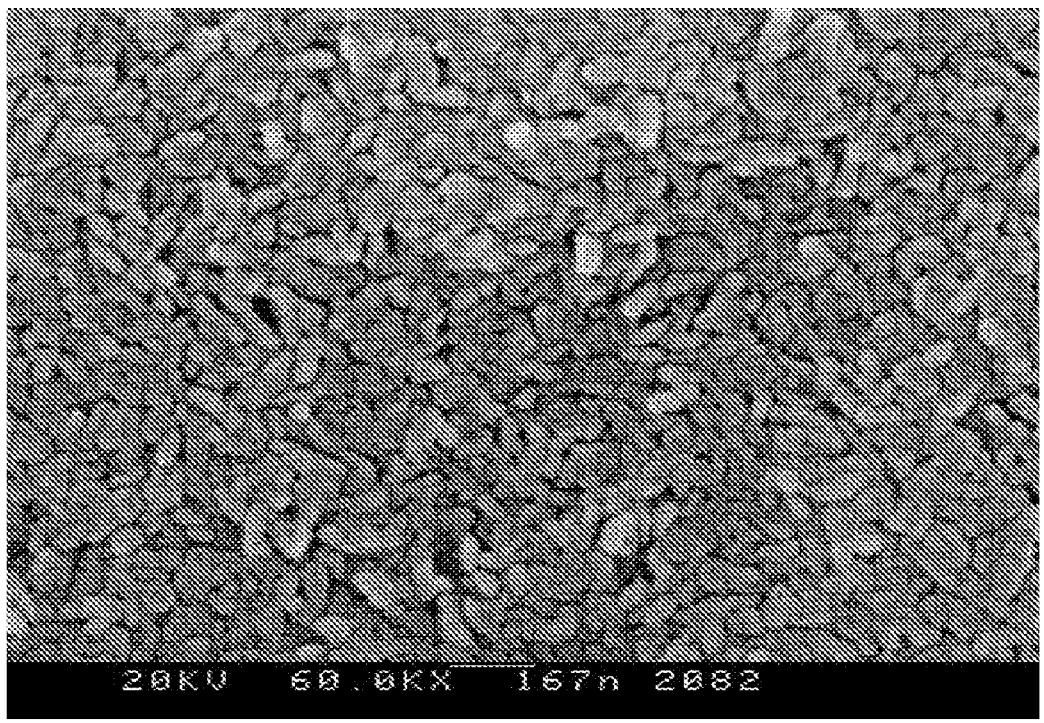
FIG. 3 is an SEM micrograph illustrating ellipsoid-shaped boehmite particulate material.
Figure 4:
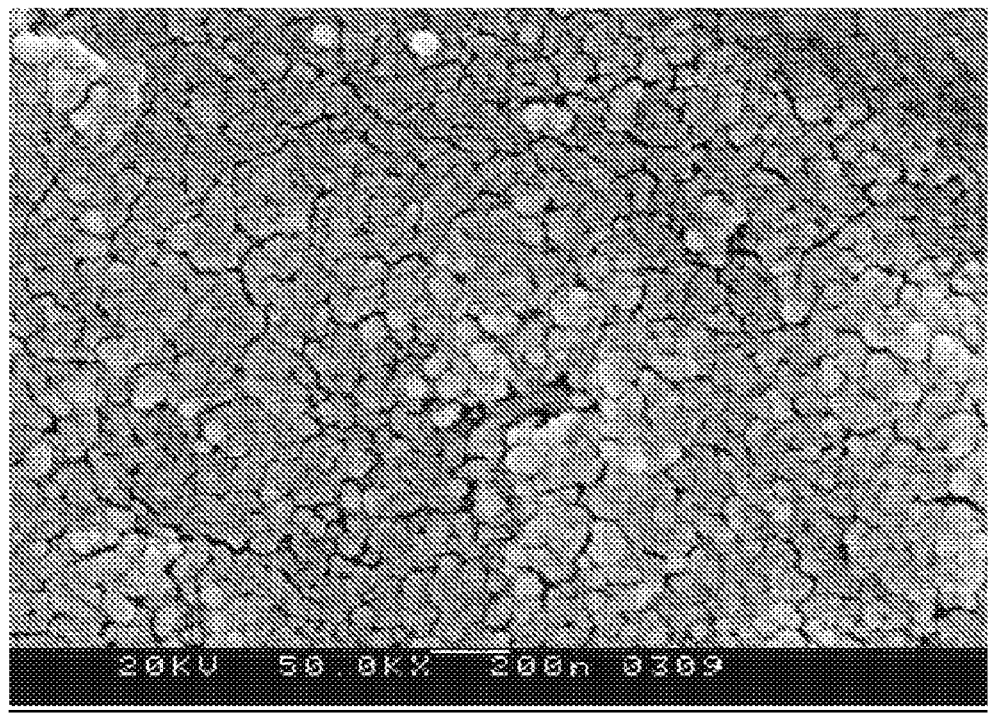
FIG. 4 is an SEM micrograph illustrating spherical-shaped boehmite particulate material.
Figure 5:
FIG. 5 is a TEM of the material shown in FIG. 2.

Additional characterization studies were carried out to more precisely understand the effect of seeding on particle morphology. FIG. 2 illustrates needle shaped particles as discussed above. FIG. 2 reveals that the seeded particles have a nodular structure, in that the particles are 'bumpy' or 'knotty' and have a generally rough outer texture. Further characterization was carried out by TEM analysis to discover that what appears by SEM to be generally monolithic particles, the particles are actually formed of tight, dense assemblies of platelet particles as shown in FIG. 5. The particles have a controlled aggregate morphology, in that the aggregates display a level of uniformity beyond conventional aggregate technologies. It is understood that the controlled aggregate structures form the nodular structure, and are unique to the seeded approach discussed above.

Figure 6:
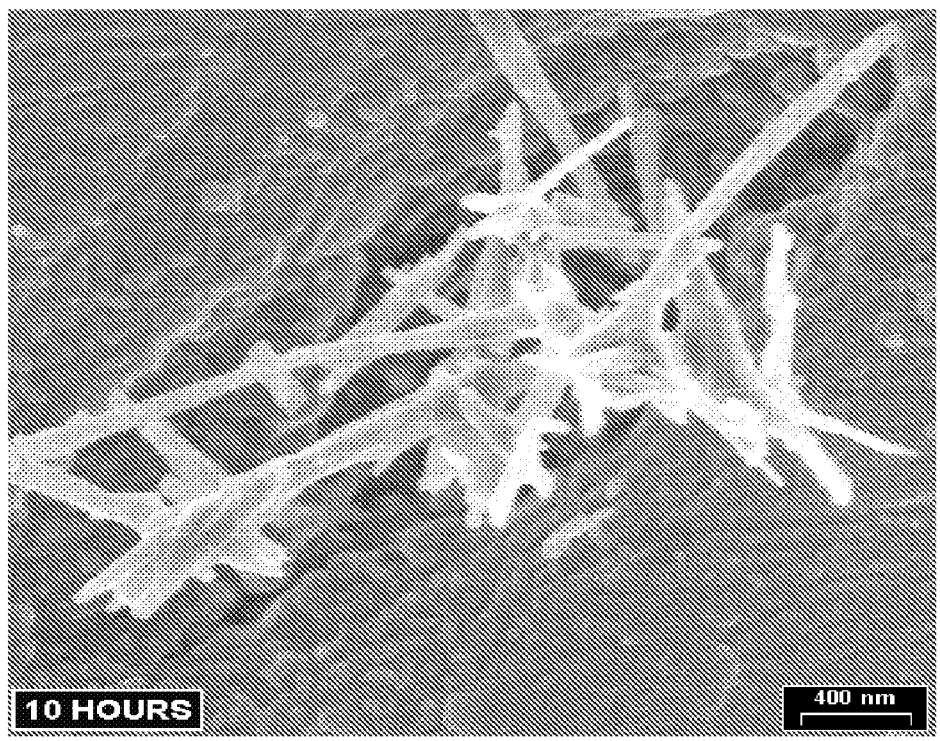
FIG. 6. is an SEM of a comparative boehmite.

It is recognized that non-seeded approaches have been found to form particulate material, including approaches that decompose raw materials through consumption of an aluminum salt, such as aluminum nitrate or aluminum sulfate. However, these metal salt decomposition approaches form morphologically distinct particulates, that are devoid of the seeded morphology, notably lacking the nodular structure. FIG. 6 is representative of such materials, showing non-seeded morphology that has a smooth or hair-like outer surface texture. Examples of such non-seeded approaches include those disclosed in U.S. Pat. No. 3,108,888 and U.S. Pat. No. 2,915,475, and thesis paper Preparation and Characterization of Acicular Particles and Thin Films of Aluminum Oxide, by Raymond M. Brusasco, May 1987. The material shown in FIG. 6 was formed the process disclosed in JP2003-054941.

Aspects of the present invention enable utilization of the boehmite particulate material in a wide variety of applications, such as a filler in specialty coatings as well as in polymer products. Indeed, the particulate material may be individually and uniformly dispersed within solvents (particularly including polar solvents), and/or polymers without forming aggregates by conventional compounding processes. In addition, the boehmite particulate material may be individually and uniformly dispersed with a non-polar solvents, and/or polymers without forming aggregates by utilizing conventional dispersing agents such as silane coupling agents. Notably, the seeded morphology, having the above-disclosed nodular structure, is understood to have particular properties in the context as a filler in a matrix material, such that the particles have improved adhesion within the matrix due to the seeded nature of the particles. Of course, particular applications of the boehmite particulate material are not so limited and may find commercial use in a variety of applications.

While the invention has been illustrated and described in the context of specific embodiments, it is not intended to be limited to the details shown, since various modifications and substitutions can be made without departing in any way from the scope of the present invention. For example, additional or equivalent substitutes can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is

1. A method for forming boehmite particulate material, comprising:
   providing a boehmite precursor and boehmite seeds in a suspension; and
   heat treating the suspension to convert the boehmite precursor into boehmite particulate material, the boehmite particulate material having an aspect ratio of not less than 3:1, wherein the boehmite seeds provide a nucleation site for the growth of the boehmite particulate material.

2. The method of claim 1, wherein heat treating is carried out at a temperature greater than 120° C.

3. The method of claim 2, wherein heat treating is carried out at a temperature greater than 130° C.

4. The method of claim 1, wherein heat treating is carried out at a pressure greater than 85 psi.

5. The method of claim 1, wherein a weight ratio of boehmite precursor to boehmite seeds is not less 60:40.

6. The method of claim 5, wherein the weight ratio is not less than 80:20.

7. The method of claim 6, wherein a weight ratio of boehmite precursor to boehmite seeds is not greater than 98:2.

8. The method of claim 1, wherein the boehmite particulate material has an average particle size of not greater than 1000 nm.

9. The method of claim 1, further including setting at least one of heat treatment temperature, species of acid or base in the suspension, or weight ratio of boehmite precursor to boehmite seeds such that the boehmite particulate material has an aspect ratio of not less than 3:1 and an average particle size not greater than 1000 nm.

10. The method of claim 9, wherein the acid or base is chosen from the group consisting of mineral acids, organic acids, halogen acids, acidic salts, amines, alkali hydroxides, alkaline hydroxides, and basic salts.

11. The method of claim 9, wherein setting includes modifying at least one of heat treatment temperature, species of acid or base, or ratio of boehmite precursor to boehmite seeds.

12. The method of claim 11, wherein the ratio of boehmite precursor to boehmite seeds is increased to increase aspect ratio, or decreased to decrease aspect ratio.

13. The method of claim 11, wherein the heat treatment temperature is increased to increase particle size, or decreased to reduce particle size.

14. The method of claim 11, wherein the species of acid or base is modified to modify aspect ratio.

* * * * *

UNITED STATES PATENT AND TRADEMARK OFFICE
CERTIFICATE OF CORRECTION

| | | |
|---|---|---|
| PATENT NO. | : 7,582,277 B2 | Page 1 of 1 |
| APPLICATION NO. | : 11/834527 | |
| DATED | : September 1, 2009 | |
| INVENTOR(S) | : Ralph Bauer et al. | |

It is certified that error appears in the above-identified patent and that said Letters Patent is hereby corrected as shown below:

Page 2, column 2, please delete "JP 0 015 196" and insert therefore --EP 0 015 196--.

Page 2, column 2, please delete "JP 200-239014" and insert therefore --JP 2000-239014--.

Signed and Sealed this

Twenty-third Day of November, 2010

David J. Kappos
*Director of the United States Patent and Trademark Office*